(12) United States Patent
Wang

(10) Patent No.: US 9,898,145 B2
(45) Date of Patent: Feb. 20, 2018

(54) TOUCH DISPLAY PANEL AND TOUCH DISPLAY DEVICE WITH THE TOUCH DISPLAY PANEL

(71) Applicants: BOE TECHNOLOGY GROUP CO., LTD., Beijing (CN); BEIJING BOE DISPLAY TECHNOLOGY CO., LTD., Beijing (CN)

(72) Inventor: Xiao Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 31 days.

(21) Appl. No.: 14/436,398

(22) PCT Filed: Oct. 11, 2014

(86) PCT No.: PCT/CN2014/088411
§ 371 (c)(1),
(2) Date: Apr. 16, 2015

(87) PCT Pub. No.: WO2015/165217
PCT Pub. Date: Nov. 5, 2015

(65) Prior Publication Data
US 2016/0147332 A1    May 26, 2016

(30) Foreign Application Priority Data

Apr. 29, 2014    (CN) .......................... 2014 1 0178025

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04103* (2013.01)

(58) Field of Classification Search
CPC ........ G06F 3/041–3/0414; G06F 3/044; G06F 3/045; G06F 3/047; G06F 2203/04103;
(Continued)

(56) References Cited

U.S. PATENT DOCUMENTS

2007/0070047 A1    3/2007 Jeon et al.
2007/0097298 A1*   5/2007 Maeda .............. G02F 1/133555
                                                    349/114

(Continued)

OTHER PUBLICATIONS

Extended European Search Report from the European Patent Office, Berlin, regarding Application No. PCT/CN2014/088411 dated Nov. 2, 2017.

*Primary Examiner* — Nathan Danielsen
(74) *Attorney, Agent, or Firm* — Harness, Dickey & Pierce, P.L.C.

(57) ABSTRACT

The present disclosure provides a touch display panel and a touch display device. The touch display panel includes a first substrate and a second substrate arranged opposite to each other to form a cell. The second substrate includes a matrix common electrode. The touch display panel further includes a first signal transmission line arranged on the first substrate and a second signal transmission line arranged on the first substrate, and the second signal transmission line is intersected with the first signal transmission line; and a first spacer corresponding to the first signal transmission line and a second spacer corresponding to the second signal transmission line. The first spacer and the second spacer are configured to enable the first signal transmission line and the second signal transmission line to be electrically connected to the matrix common electrode when a corresponding touch region is in a touch state.

20 Claims, 3 Drawing Sheets

(58) Field of Classification Search
CPC .............................. G06F 2203/04107; G06F 2203/04111–2203/04113
See application file for complete search history.

(56) References Cited

U.S. PATENT DOCUMENTS

| | | | |
|---|---|---|---|
| 2007/0195029 A1* | 8/2007 | Jeon | G02F 1/13338 345/87 |
| 2007/0252614 A1* | 11/2007 | Jeon | G02F 1/13454 324/760.01 |
| 2008/0055502 A1* | 3/2008 | Wu | G02F 1/13338 349/38 |
| 2008/0100590 A1 | 5/2008 | Hur et al. | |
| 2009/0180043 A1 | 7/2009 | Rho et al. | |
| 2009/0237369 A1* | 9/2009 | Hur | G06F 3/0412 345/173 |
| 2010/0141595 A1 | 6/2010 | Lai et al. | |
| 2010/0156827 A1* | 6/2010 | Joo | G02F 1/13338 345/173 |
| 2011/0007020 A1* | 1/2011 | Hong | G06F 3/0412 345/174 |
| 2014/0028616 A1* | 1/2014 | Furutani | G06F 3/044 345/174 |
| 2014/0313435 A1* | 10/2014 | Cho | G06F 3/0412 349/12 |

\* cited by examiner

TOUCH DISPLAY PANEL AND TOUCH DISPLAY DEVICE WITH THE TOUCH DISPLAY PANEL

CROSS-REFERENCE TO RELATED APPLICATIONS

The present application is the U.S. national phase of PCT Application No. PCT/CN2014/088411 filed on Oct. 11, 2014, which claims a priority of the Chinese patent application No. 201410178025.0 filed on Apr. 29, 2014, the disclosures of which are incorporated herein by reference in their entirety.

TECHNICAL FIELD

The present disclosure relates to the field of display technology, in particular to a touch display panel and a touch display device.

BACKGROUND

Along with the development of flat-panel display technologies, liquid crystal displays have been widely used in such display devices as notebook PCs, monitors and TVs. As multimedia information query increases, a touch screen has been used increasingly. The display device may be operated by touching symbols or words on the display screen, so it is able to perform the human-machine interaction in a more straightforward manner. In addition, the touch screen has such advantages as being durable, rapid response, being space-saving, and being easy for communication.

Depending on their working principles and a medium for information transmission, the touch screens may be divided into four types including a resistive touch screen, a capacitive touch screen, an infrared touch screen and a surface-acoustic-wave touch screen. The resistive and capacitive touch screens have been widely used.

An In-cell touch design, as a final solution for touch and display, is used to achieve one-stop, seamless production and true integration of the touch screen with a liquid crystal display (LCD). It has such advantages as excellent integration, being light and thin, low production cost, low power consumption, high image quality and multi-point touch function, and thus has become a new trend for the touch technology.

Recently, the in-cell touch design mainly includes a resistive type, a capacitive type and an optical type. For an existing in-cell touch design, touch signal transmission lines are arranged on an array substrate. As a result, a certain region of the array substrate is occupied by the touch signal transmission lines (including X-axis and Y-axis signal transmission lines), and thereby an aperture ratio of the touch display panel is adversely affected.

SUMMARY

The present disclosure provides a touch display panel and a touch display device, which can detect a touch region precisely and improve an aperture ratio of the touch display panel.

Solutions provided in the present disclosure are as follows.

The present disclosure provides in one embodiment a touch display panel, including a first substrate and a second substrate arranged opposite to each other to form a cell. The second substrate includes a matrix common electrode. The touch display panel further includes:

a first signal transmission line arranged on the first substrate and a second signal transmission line arranged on the first substrate, and the second signal transmission line being intersected with the first signal transmission line; and a first spacer corresponding to the first signal transmission line and a second spacer corresponding to the second signal transmission line; the first spacer and the second spacer being configured to enable the first signal transmission line and the second signal transmission line to be electrically connected to the matrix common electrode when a corresponding touch region is in a touch state.

Alternatively, the first signal transmission line and the second signal transmission line each are made of a transparent conductive material.

Alternatively, the first signal transmission line is of an extension direction identical to an extension direction of a gate line on the second substrate; and the second signal transmission line is of an extension direction identical to an extension direction of a data line on the second substrate.

Alternatively, the first substrate further includes a black matrix; and the first signal transmission line and the second signal transmission line are arranged at a side of the black matrix adjacent to the second substrate.

Alternatively, an insulation layer is arranged between the first signal transmission line and the second signal transmission line at a junction between the first signal transmission line and the second signal transmission line.

Alternatively, the first spacer and the second spacer each are of a spherical or cylindrical shape.

Alternatively, the first spacer and the second spacer each are made of a transparent conductive material; or, the first spacer and the second spacer each are composed of a support member and a conductive material surrounding a surface of the support member.

Alternatively, the first spacer is arranged on the first substrate; a first end of the first spacer is electrically connected to a side of the first signal transmission line adjacent to the second substrate, and a second end of the first spacer is spaced apart from the matrix common electrode on the second substrate at a certain distance when the corresponding touch region is in a non-touch state; and the first spacer is in contact with the matrix common electrode when the corresponding touch region is in the touch state.

The second spacer is arranged on the first substrate; a first end of the second spacer is electrically connected to a side of the second signal transmission line adjacent to the second substrate, and a second end of the second spacer is spaced apart from the matrix common electrode on the second substrate at a certain distance when the corresponding touch region is in the non-touch state; and the second spacer is in contact with the matrix common electrode when the corresponding touch region is in the touch state.

Alternatively, the first spacer is arranged on the second substrate; a second end of the first spacer is electrically connected to the matrix common electrode, and a first end of the first spacer is spaced apart from the first signal transmission line on the first substrate at a certain distance when the corresponding touch region is in a non-touch state; and the first spacer is in contact with the first signal transmission line when the corresponding touch region is in the touch state.

The second spacer is arranged on the second substrate; a second end of the second spacer is electrically connected to the matrix common electrode, and a first end of the second spacer is spaced apart from the second signal transmission line on the first substrate at a certain distance when the corresponding touch region is in the non-touch state; and the second spacer is in contact with the second signal transmission line when the corresponding touch region is the touch state.

Alternatively, a contact portion between the first signal transmission line and the first spacer is of an area greater than an area of the first end of the first spacer; and a contact portion between the second signal transmission line and the second spacer is of an area greater than an area of the first end of the second spacer.

Alternatively, the matrix common electrode includes a common electrode connecting line; the common electrode connecting line is configured to connect a common electrode and a common electrode line which are at two sides of a gate line on the second substrate so as to form the matrix common electrode; and the first spacer and the second spacer are arranged at two ends of the common electrode connecting line and electrically connected to the common electrode connecting line.

Alternatively, the first spacer and the second spacer are arranged within a pixel unit; or, the first spacer and the second spacer are arranged at a position where a gate line or a data line is located.

Alternatively, the first substrate is a color filter substrate, and the second substrate is an array substrate. The first signal transmission line transmits a signal which is used to determine a horizontal coordinate of the touch region; and the second signal transmission line transmits a signal which is used to determine a vertical coordinate of the touch region.

The present disclosure further provides in one embodiment a touch display device including the above-mentioned touch display panel.

As can be seen from the above description, according to the touch display panel and the touch display device in the embodiments of the present disclosure, the touch display panel includes the first substrate and the second substrate arranged opposite to each other to form a cell, and the matrix common electrode is arranged on the second substrate. The touch display panel further includes the first signal transmission line arranged on the first substrate and the second signal transmission line arranged on the first substrate, and the second signal transmission line being intersected with the first signal transmission line, and the first spacer corresponding to the first signal transmission line and the second spacer corresponding to the second signal transmission line. The first spacer and the second spacer are configured to enable the first signal transmission line and the second signal transmission line to be electrically connected to the matrix common electrode when the corresponding touch region in the touch state. As a result, it is able to detect the touch region precisely and to ensure an aperture ratio of the touch display panel due to the fact that the signal transmission lines do not occupy a region of the array substrate.

DETAILED DESCRIPTION

In order to make the objects, the technical solutions and the advantages of the present disclosure more apparent, the technical solutions of embodiments of the present disclosure will be described hereinafter in a clear and complete manner in conjunction with the drawings of the embodiments of the present disclosure. Obviously, the following embodiments are merely a part of, rather than all of, the embodiments of the present disclosure. Based on these embodiments, a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
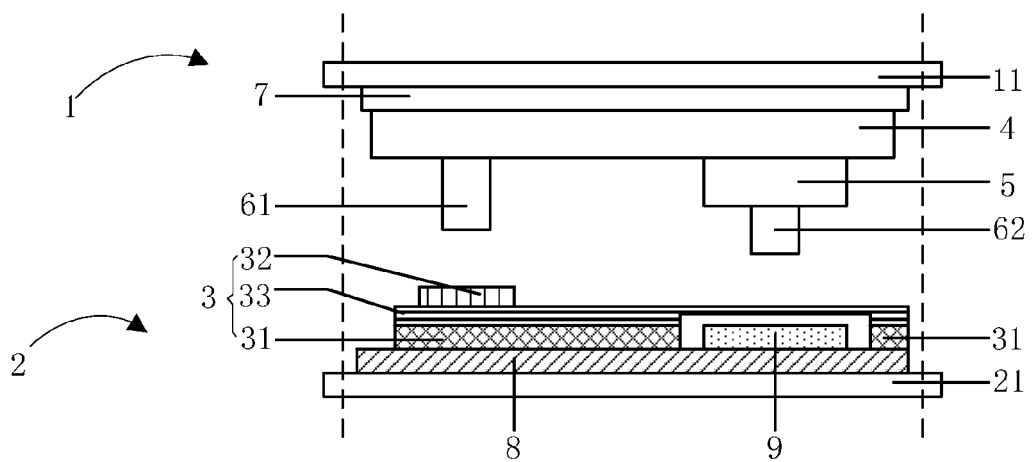
FIG. 1 is a first structure diagram of a touch display panel according to one embodiment of the present disclosure.
Figure 4:
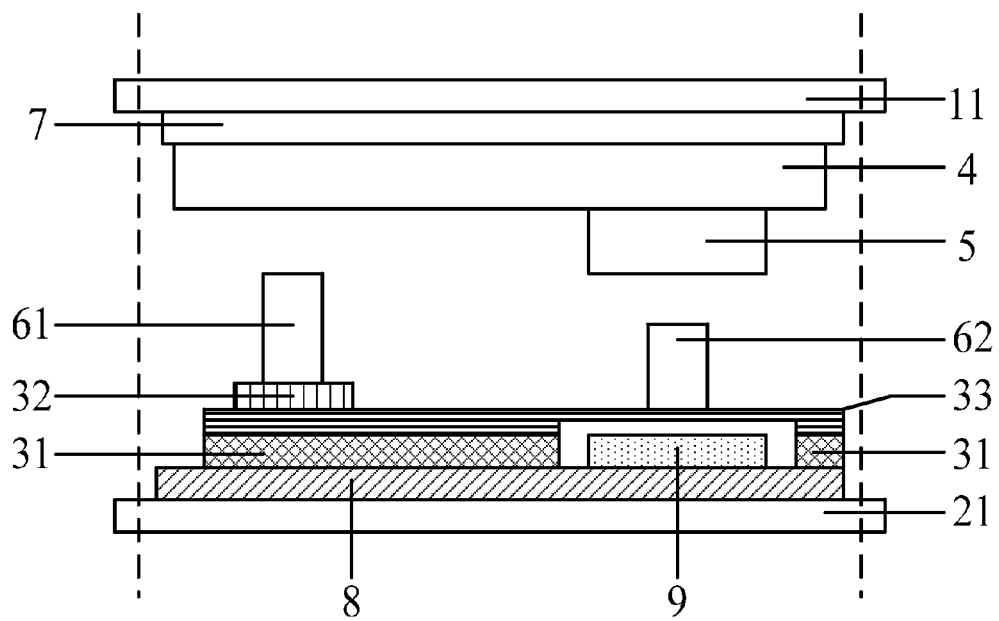
FIG. 4 is a third structure diagram of a touch display panel according to one embodiment of the present disclosure.

The present disclosure provides in one embodiment a touch display panel, including a first substrate 1 and a second substrate 2 arranged opposite to each other to form a cell. A matrix common electrode (Matrix Vcom) 3 is arranged on the second substrate 2. As shown in FIGS. 1 and 4, the touch display panel may further include:

a first signal transmission line 4 arranged on the first substrate 1 and a second signal transmission line 5 intersecting the first signal transmission line 4; and a first spacer 61 corresponding to the first signal transmission line 4 and a second spacer 62 corresponding to the second signal transmission line 5, the first spacer 61 and the second spacer 62 being configured to enable the first signal transmission line 4 and the second signal transmission line 5 to be electrically connected to the matrix common electrode 3 when a corresponding touch region is in a touch state.

In this embodiment of the present disclosure, the first substrate 1 may be a color filter substrate a, and the second substrate 2 may be an array substrate 2.

The touch display panel in the embodiment of the present disclosure may detect the touch region precisely. In addition, since the first signal transmission line 4 and the second signal transmission line 5 configured to transmit a touch signal are arranged on the color filter substrate 1, thus it is able to prevent the signal transmission lines from occupying a region on the array substrate 2, thereby to ensure an aperture ratio of the touch display panel.

In the embodiment of the present disclosure, when the corresponding touch region is in the touch state, the first spacer 61 and the second spacer 62 may enable the first signal transmission line 4 and the second signal transmission line 5 to be electrically connected to the matrix common electrode 3, respectively. No matter whether or not there exists an initial signal in the first signal transmission line 4 and the second signal transmission line 5 themselves, a potential of the matrix common electrode 3 is introduced as a new touch signal into the first signal transmission line 4 and the second signal transmission line 5, so that a potential of the signal transmitted by the first signal transmission line 4 and the second signal transmission line 5 is changed. Based upon this change in the potential, a positioning chip connected to ends of the first signal transmission line 4 and the second signal transmission line 5 may determine position information of the touch region where the touch is made.

For example, when there exists an initial signal in the first signal transmission line 4 and the second signal transmission line 5 themselves (at this time, one end of each of the first signal transmission line 4 and the second signal transmission line 5 may be connected to a component from which the initial signal is transmitted, and the other end is connected to the positioning chip), the potential of the signal transmitted by the first signal transmission line 4 and the second signal transmission line 5 is changed, regardless of the relationship of size between the potential of the initial signal and the potential of the matrix common electrode.

For example, when the potential of the initial signal is greater than the potential of the matrix common electrode, the initial signal is transmitted toward the matrix common electrode 3 so that the potential of the signal transmitted via the first signal transmission line 4 and the second signal transmission line 5 is reduced. The positioning chip may determine the touch region where the touch is made in accordance with the change in the potential, i.e., a decrease in the potential. When the potential of the initial signal is smaller than the potential of the matrix common electrode 3, the signal of the matrix common electrode 3 is transmitted toward the first signal transmission line 4 and the second signal transmission line 5 so that the potential of the signal transmitted via the first signal transmission line 4 and the second signal transmission line 5 is increased. The positioning chip may determine the touch region where the touch is made in accordance with the change in the potential, i.e., an increase in the potential.

When there exists no initial signal in the signal transmission line 4 and the second signal transmission line 5 themselves (at this time, one end of each of the first signal transmission line 4 and the second signal transmission line 5 is floated, and the other end is connected to the positioning chip) and a touch is made, the signal in the matrix common electrode 3 is transmitted toward the first signal transmission line 4 and the second signal transmission line 5 so that the potential of the signal transmitted via the first signal transmission line 4 and the second signal transmission line 5 is increased. The positioning chip may determine the touch region where the touch is made in accordance with the change in the potential, i.e., an increase in the potential.

In addition, due to the resistance of the spacer itself, when the spacer is in contact with the corresponding signal transmission line or the matrix common electrode 3 in the touch state, a new signal transmission channel, i.e., a channel composed of the signal transmission line, the spacer and the matrix common electrode 3, is formed. A resistance of this signal transmission channel is changed relative to a resistance of an original signal transmission channel (only including the signal transmission line and the spacer, or only including the matrix common electrode 3 and the spacer). The change in the resistances may result in a change in a signal received by the positioning chip, so the positioning chip may determine the touch region where the touch is made in accordance with the change in the received signal.

The first spacer 61 and the second spacer 62 involved in this embodiment of the present disclosure may be arranged on the first substrate 1 or the second substrate 2.

When the first spacer 61 and the second spacer 62 are arranged on the first substrate 1, as shown in FIG. 1, the first substrate 1 specifically may include a glass substrate 11, the first spacer 61, the second spacer 62, the first signal transmission line 4, the second signal transmission line 5 and a black matrix 7.

The black matrix 7 is arranged at a side of the glass substrate 11 adjacent to the second substrate 2. The first signal transmission line 4 and the second signal transmission line 5 are arranged at a side of the black matrix 7 adjacent to the second substrate 2.

A first end, e.g., an upper end (when the touch display panel is located at a position as shown in FIG. 1), of the first spacer 61 is electrically connected to a side of the first signal transmission line 4 adjacent to the second substrate 2; and a second end, e.g., a lower end (when the touch display panel is located at the position as shown in FIG. 1), of the first spacer 61 is spaced apart from the matrix common electrode 3 on the second substrate 2 at a certain distance when the corresponding touch region is in a non-touch state. When the corresponding touch region is in the touch state, the first spacer 61 is in contact with the matrix common electrode 3 so as to achieve an electrical connection.

A first end, e.g., an upper end (when the touch display panel is located at the position as shown in FIG. 1), of the second spacer 62 is electrically connected to a side of the second signal transmission line 5 adjacent to the second substrate 2; and a second end, e.g., a lower end (when the touch display panel is located at the position as shown in FIG. 1), of the second spacer 62 is spaced apart from the matrix common electrode 3 on the second substrate 2 at a certain distance when the corresponding touch region is in the non-touch state. When the corresponding touch region is in the touch state, the second spacer 62 is in contact with the matrix common electrode 3, so as to achieve an electrical connection.

Figure 5:
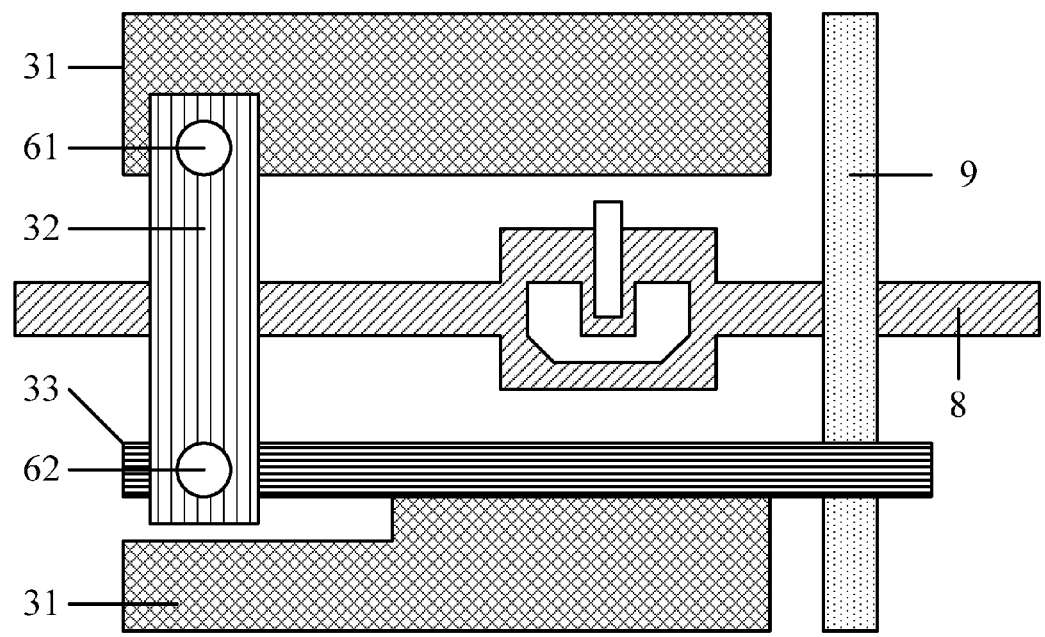
FIG. 5 is a structure diagram of a second substrate in the touch display panel according to one embodiment of the present disclosure.

As shown in FIGS. 1, 3, 4 and 5, the matrix common electrode 3 involved in the embodiment of the present disclosure specifically may be composed of a common electrode 31 at each pixel region, a common electrode line 33, and a common electrode connecting line 32 for connecting the common electrode 31 and the common electrode line 33 which are at two sides of a gate line 8 (as shown in FIG. 5). One end of the common electrode connecting line 32 is connected to the common electrode 31 at a first pixel region at a side of the gate line 8, the other end of the common electrode connecting line 32 is connected to the common electrode line 33 at a second pixel region at the other side of the gate line 8, and the common electrode line 33 is connected to the common electrode 31 at the second pixel region, so as to form the matrix common electrode 3.

In order not to adversely affect the normal display of a pixel unit on the array substrate, i.e., the second substrate 2, in this embodiment of the present disclosure, the first signal transmission line 4 and the second signal transmission line 5 each may be made of a transparent conductive material, e.g., indium tin oxide (ITO).

In this way, no matter which positions on the color filter substrate, i.e., the first substrate 1, the first signal transmission line 4 and the second signal transmission line 5 are arranged, the normal display of the pixel unit on the array substrate, i.e., the second substrate 2, will not be adversely affected. This also facilitates the arrangement of the spacers 61 and 62 involved in one embodiment of the present disclosure.

In one embodiment of the present disclosure, a signal transmitted via the first signal transmission line 4 may be used to determine a horizontal coordinate, i.e., X-axis position information, of the touch region, and a signal transmitted via the second signal transmission line 5 may be used to determine a vertical coordinate, i.e., Y-axis position information, of the touch region.

Figure 2:
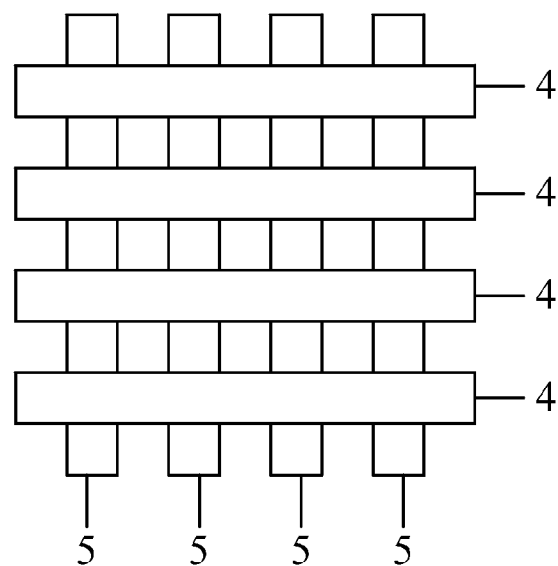
FIG. 2 is a structure diagram of a first substrate in the touch display panel according to one embodiment of the present disclosure.

In other words, in one embodiment of the present disclosure, the first signal transmission line 4 has an extension direction identical to, e.g., parallel to, an extension direction of the gate line 8 on the second substrate 2; and the second signal transmission line 5 has an extension direction identical to, e.g., parallel to, an extension direction of a data line 9 on the first substrate 2, so as to form the crisscross structure as shown in FIG. 2.

Figure 3:
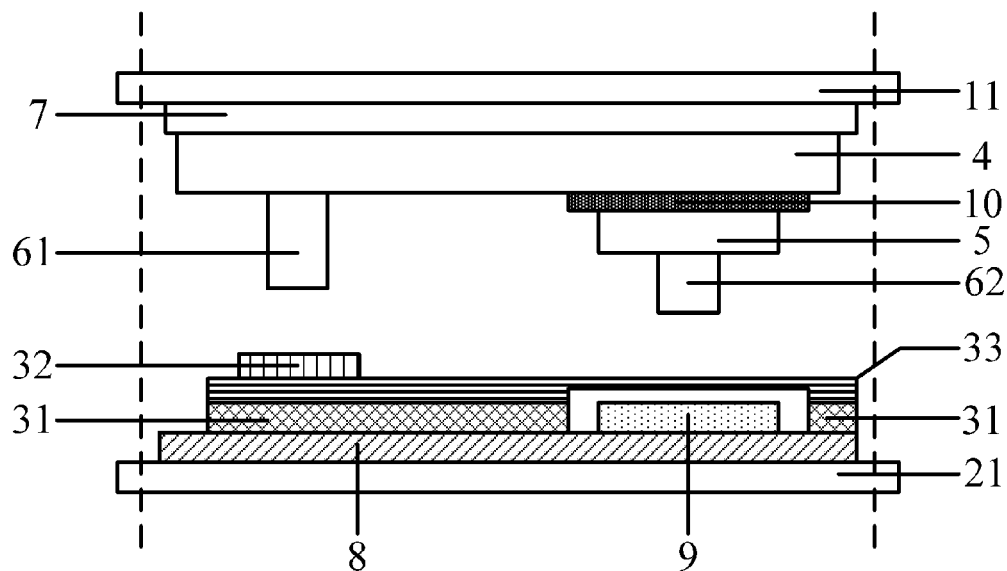
FIG. 3 is a second structure diagram of a touch display panel according to one embodiment of the present disclosure.
Figure 6:
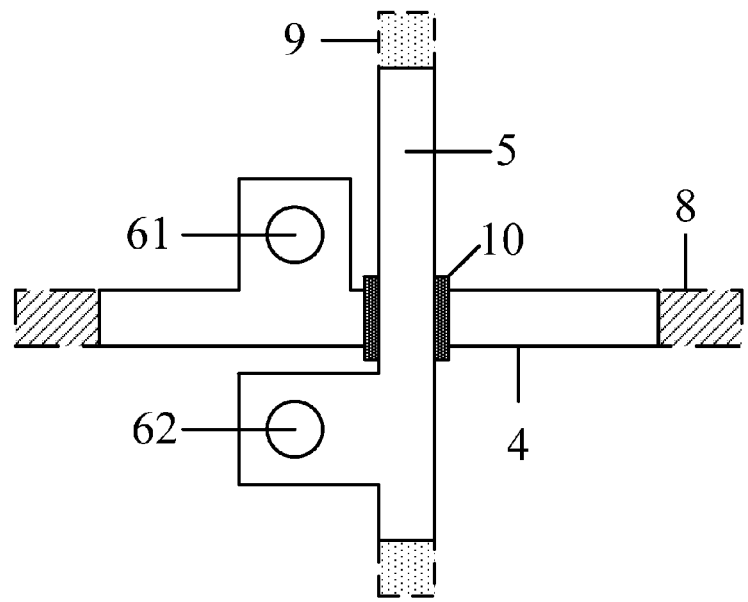
FIG. 6 is a fourth structure diagram of a touch display panel according to one embodiment of the present disclosure.

In one embodiment of the present disclosure, since the first signal transmission lines 4 and the second signal transmission lines 5 are arranged in a crisscross manner, thus, in order to prevent signal interference between two signal transmission lines as well the occurrence of current leakage and electrical connection, as shown in FIGS. 3 and 6, an insulating shielding layer 10 may be arranged between the first signal transmission line 4 and the second signal transmission line 5 at a junction between the first signal transmission line 4 and the second signal transmission line 5. As a result, in the case of no signal crosstalk, current leakage and electrical connection between the signal transmission lines, the quality of the signal received by the positioning chip is ensured.

In one embodiment of the present disclosure, as shown in FIG. 6, the first signal transmission line 4 may be arranged at a position on the first substrate 1 corresponding to a position on the second substrate 2 where the gate line 8 is arranged; and the second signal transmission line 5 may be arranged at a position on the first substrate 1 corresponding to a position on the second substrate 2 where the data line 9 is arranged. In other words, the first signal transmission line 4 may be arranged above the gate line 8 on the second substrate 2, and the second signal transmission line 5 may be arranged above the data line 9 on the second substrate 2.

Since the black matrix 7 is arranged on the first substrate 1 at a region corresponding to the gate line 8 and the data line 9 on the second substrate 2 so as to shield the gate line 8 and the data line 9, thus, when the first signal transmission line 4 is arranged above the gate line 8 and the second transmission line 5 is arranged above the data line 9, the first signal transmission line 4 and the second signal transmission line 5 are also shielded by the black matrix 7 which is arranged above the gate line 8 and the data line 9. As a result, the first signal transmission line 4 and the second signal transmission line 5 may be made of various materials, but not limited to the transparent material.

In one embodiment of the present disclosure, the first spacer 61 and the second spacer 62 may be of a spherical or cylindrical shape, and they may also be made of a transparent conductive material, e.g., ITO.

In addition, the first spacer 61 and the second spacer 62 may also be composed of a support member and a conductive material surrounding a surface of the support member, so that when the touch is made, the spacer may be electrically connected with the corresponding signal transmission line and further function as a support.

When the first spacer 61 and the second spacer 62 are arranged on the second substrate 2, as shown in FIG. 4, the second substrate 2 specifically may include a glass substrate 21, the first spacer 61, the second spacer 62, the matrix common electrode 3 (composed of the common electrode 31, the common electrode connecting line 32 and the common electrode line 33), the gate line 8 and the data line 9. It should be appreciated that, FIG. 4 is for illustrative purposes only, but shall not be used to limit the layers included in the second substrate 2 as well as the structural relationship thereamong.

As shown in FIG. 4, the second end, e.g., a lower end (when the touch display is located at a position as shown in FIG. 4), of the first spacer 61 on the second substrate 2 is electrically connected to the matrix common electrode 3; and the first end, e.g., an upper end (when the touch display panel is located at the position as shown in FIG. 4), of the first spacer 61 is spaced apart from the first signal transmission line 4 on the first substrate 1 at a certain distance when the corresponding touch region is in the non-touch state. When the corresponding touch region is in the touch state, the first spacer 61 is in contact with the first signal transmission line 4, so as to achieve an electrical connection.

The second end, e.g., a lower end (when the touch display panel is located at the position as shown in FIG. 4), of the second spacer 62 on the second substrate 2 is electrically connected to the matrix common electrode 3; and the first end, e.g., an upper end (when the touch display panel is located at the position as shown in FIG. 4), of the second spacer 62 is spaced apart from the second signal transmission line 5 on the first substrate 1 at a certain distance when the corresponding touch region is in the non-touch state. When the corresponding touch region is in the touch state, the second spacer 62 is in contact with the second signal transmission line 5, so as to achieve an electrical connection.

Similarly, the matrix common electrode 3 in this embodiment may also be composed of the common electrode 31 in each pixel region, the common electrode line 33, and the common electrode connecting line 32 for connecting the common electrode 31 and the common electrode line 33 which are at two sides of the gate line 8.

In one embodiment of the present disclosure, as shown in FIG. 5, the first spacer 61 and the second spacer 62 may be arranged at two sides of the gate line 8 and correspond to two ends of the common electrode connecting line 32 (when the first spacer 61 and the second spacer 62 are arranged on the first substrate 1, the first spacer 61 and the second spacer 62 are arranged at positions corresponding to two ends of the common electrode connecting line 32), respectively. In this way, when no touch is made, the common electrode connecting line 32 connects the common electrodes in the pixel units which are at two sides of the gate line 8, so as to achieve the electrical connection between the common electrodes 31 at different regions. When the touch is made, the first spacer 61 and the second spacer 62 may be used as conductive elements so as to enable the common electrode connecting line 32 (i.e., the matrix common electrode 3) to be electrically connected to the first signal transmission line 4 (not shown in FIG. 5) and the second signal transmission line 5 (not shown in FIG. 5). As a result, a detection signal for determining the touch region is generated.

In one embodiment of the present disclosure, the first spacer 61 and the second spacer 62 may be arranged within a pixel unit on the second substrate 2.

In another embodiment, the first spacer 61 and the second spacer 62 may be arranged at a position on the second substrate 2 corresponding to the position of the black matrix 7 on the first substrate 1. In this way, the first spacer 61 and the second spacer 62 do not occupy other display regions of the pixel unit, and thus the aperture ratio is not adversely affected.

In one embodiment of the present disclosure, when the first signal transmission line 4 is arranged above the gate line 8 and the second signal transmission line 5 is arranged above the data line 9, the first signal transmission line 4 may be arranged corresponding to the first spacer 61 which is arranged at a position shown in FIG. 5 through a pattern structure as shown in FIG. 6, and the second signal transmission line 5 may be arranged corresponding to the second spacer 62 which is arranged at a position shown in FIG. 5 through the pattern structure as shown in FIG. 6.

In addition, in one embodiment of the present disclosure, the first spacer 61 may also be arranged at a position where the gate line 8 is located, so as to correspond to the first signal transmission line 4 which is arranged above the gate line 8; while the second spacer 62 may also be arranged at a position where the data line 9 is located, so as to correspond to the second signal transmission line 5 which is arranged above the data line 9. Since the first signal transmission line 4, the second signal transmission line 5, the first spacer 61 and the second spacer 62 may also be shielded by the black matrix 7 which is arranged above the gate line 8 and the data line 9, thus, the first signal transmission line 4, the second signal transmission line 5, the first spacer 61 and the second spacer 62 may be made of various materials, but not limited to a transparent material.

When the first signal transmission line 4, the second signal transmission line 5, the first spacer 61 and the second spacer 62 are made of a transparent material, e.g., ITO, the first signal transmission line 4, the second signal transmission line 5, the first spacer 61 and the second spacer 62 may also be arranged at the display region of the pixel unit.

It should be appreciated that, in one embodiment of the present disclosure, the corresponding first spacer 61 and second spacer 62 (e.g., a pair of spacers, or spacers in different pairs of spacers) may be arranged in each pixel unit, or a pair of spacers may correspond to a plurality of pixel units. In other words, in one embodiment of the present disclosure, one touch region may correspond to one pixel unit or a plurality of pixel units.

In one embodiment of the present disclosure, in order to enable the signal transmission line to be in contact with the spacer in a better manner, as shown in FIG. 6, a contact portion between the first signal transmission line 4 and the first spacer 61 is of an area greater than an area of the upper end of the first spacer 61, and a contact portion between the second signal transmission line 5 and the second spacer 62 is of an area greater than an area of the upper end of the second spacer 62. As a result, it is able to ensure that the signal transmission line is in contact with the spacer in a better manner and ensure that the electrical connection between the signal transmission line, as well as the spacer, and the matrix common electrode 3.

In the embodiments of the present disclosure, the touch display panel may be an ADS-type panel, and it may further include other layers and elements, such as a pixel electrode corresponding to the matrix common electrode 3 (i.e., the common electrode).

The present disclosure further provides in one embodiment a touch display device including the touch display panel of the above-mentioned embodiments of the present disclosure.

The display panel may be a liquid crystal display panel, a liquid crystal TV, a liquid crystal display, an OLED panel, an OLED display, a plasma display, or an electronic paper.

As can be seen from the above description, according to the touch display panel and the touch display device in the embodiments of the present disclosure, the touch display panel includes the first substrate and the second substrate arranged opposite to each other to form a cell, and the matrix common electrode is arranged on the second substrate. The touch display panel further includes the first signal transmission line and the second signal transmission line which are arranged on the first substrate and intersected with each other, the first spacer corresponding to the first signal transmission line and the second spacer corresponding to the second signal transmission line. The first spacer and the second spacer are configured to enable the first signal transmission line and the second signal transmission line to be electrically connected to the matrix common electrode when the corresponding touch region in the touch state. As a result, it is able to detect the touch region precisely, and to ensure an aperture ratio of the touch display panel due to the fact that the signal transmission lines do not occupy a region of the array substrate.

The above are merely embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A touch display panel, comprising:
a first substrate and a second substrate arranged opposite to each other to form a cell; the second substrate comprising a matrix common electrode, a gate line, and a data line;
a first signal transmission line arranged on the first substrate and a second signal transmission line arranged on the first substrate, the second signal transmission line intersecting with the first signal transmission line; and
a first spacer corresponding to the first signal transmission line and a second spacer corresponding to the second signal transmission line,
wherein the first spacer and the second spacer are configured to enable the first signal transmission line and the second signal transmission line to be electrically connected to the matrix common electrode when a corresponding touch region is in a touch state,
wherein the first substrate is a color filter substrate and the second substrate is an array substrate.

2. The touch display panel according to claim 1, wherein the first signal transmission line and the second signal transmission line are each made of a transparent conductive material.

3. The touch display panel according to claim 1, wherein the first signal transmission line extends in a direction identical to an extension direction of the gate line on the second substrate; and the second signal transmission line extends in a direction identical to an extension direction of the data line on the second substrate.

4. The touch display panel according to claim 1, wherein the first substrate further comprises a black matrix; and the first signal transmission line and the second signal transmission line are arranged at a side of the black matrix adjacent to the second substrate.

5. The touch display panel according to claim 1, wherein an insulation layer is arranged between the first signal transmission line and the second signal transmission line at a junction between the first signal transmission line and the second signal transmission line.

6. The touch display panel according to claim 1, wherein the first spacer and the second spacer comprise at least one of a spherical or a cylindrical shape.

7. The touch display panel according to claim 1, wherein:
the first spacer and the second spacer are at least one of
(1) each made of a transparent conductive material; or
(2) each composed of a support member and a conductive material surrounding a surface of the support member.

8. The touch display panel according to claim 1, wherein the first spacer is arranged on the first substrate; a first end of the first spacer is electrically connected to a side of the first signal transmission line adjacent to the second substrate, and a second end of the first spacer is spaced apart from the matrix common electrode on the second substrate at a certain distance when the corresponding touch region is in a non-touch state; and the first spacer is in contact with the matrix common electrode when the corresponding touch region is in the touch state;
the second spacer is arranged on the first substrate; a first end of the second spacer is electrically connected to a side of the second signal transmission line adjacent to the second substrate, and a second end of the second spacer is spaced apart from the matrix common electrode on the second substrate at a certain distance when the corresponding touch region is in the non-touch state; and the second spacer is in contact with the matrix common electrode when the corresponding touch region is in the touch state.

9. The touch display panel according to claim 1, wherein the first spacer is arranged on the second substrate; a second end of the first spacer is electrically connected to the matrix common electrode, and a first end of the first spacer is spaced apart from the first signal transmission line on the first substrate at a certain distance when the corresponding touch region is in a non-touch state; and the first spacer is in contact with the first signal transmission line when the corresponding touch region is in the touch state;
the second spacer is arranged on the second substrate; a second end of the second spacer is electrically connected to the matrix common electrode, and a first end of the second spacer is spaced apart from the second signal transmission line on the first substrate at a certain distance when the corresponding touch region is in the non-touch state; and the second spacer is in contact with the second signal transmission line when the corresponding touch region is the touch state.

10. The touch display panel according to claim 9, wherein a contact portion between the first signal transmission line and the first spacer is of an area greater than an area of the first end of the first spacer; and a contact portion between the second signal transmission line and the second spacer is of an area greater than an area of the first end of the second spacer.

11. The touch display panel according to claim 9, wherein the matrix common electrode comprises a common electrode connecting line; the common electrode connecting line is configured to connect a common electrode and a common electrode line which are at two sides of the gate line on the second substrate so as to form the matrix common electrode; and the first spacer and the second spacer are arranged at two ends of the common electrode connecting line and electrically connected to the common electrode connecting line.

12. The touch display panel according to claim 9, wherein the first spacer and the second spacer are at least one of (1) arranged within a pixel unit; or
(2) arranged at a position where at least one of the gate line or the data line is disposed.

13. The touch display panel according to claim 1, the first signal transmission line transmits a signal which is used to determine a horizontal coordinate of the touch region, and the second signal transmission line transmits a signal which is used to determine a vertical coordinate of the touch region.

14. A touch display device comprising the touch display panel according to claim 1.

15. A touch display panel, comprising: a first substrate and a second substrate arranged opposite to each other to form a cell, the second substrate comprising a matrix common electrode, the touch display panel further comprising:
a first signal transmission line arranged on the first substrate and a second signal transmission line arranged on the first substrate, and the second signal transmission line being intersected with the first signal transmission line; and
a first spacer corresponding to the first signal transmission line and a second spacer corresponding to the second signal transmission line; wherein the first spacer and the second spacer are configured to enable the first signal transmission line and the second signal transmission line to be electrically connected to the matrix common electrode when a corresponding touch region is in a touch state;
wherein the first spacer is arranged on the second substrate; a second end of the first spacer is electrically connected to the matrix common electrode, and a first end of the first spacer is spaced apart from the first signal transmission line on the first substrate at a certain distance when the corresponding touch region is in a non-touch state; and the first spacer is in contact with the first signal transmission line when the corresponding touch region is in the touch state;
wherein the second spacer is arranged on the second substrate; a second end of the second spacer is electrically connected to the matrix common electrode, and a first end of the second spacer is spaced apart from the second signal transmission line on the first substrate at a certain distance when the corresponding touch region is in the non-touch state; and the second spacer is in contact with the second signal transmission line when the corresponding touch region is in the touch state; and
wherein the matrix common electrode comprises a common electrode connecting line; the common electrode connecting line is configured to connect a common electrode and a common electrode line which are at two sides of a gate line on the second substrate so as to form the matrix common electrode; and the first spacer and the second spacer are arranged at two ends of the common electrode connecting line and electrically connected to the common electrode connecting line.

16. The touch display panel according to claim 15, wherein a contact portion between the first signal transmission line and the first spacer is of an area greater than an area of the first end of the first spacer; and a contact portion between the second signal transmission line and the second spacer is of an area greater than an area of the first end of the second spacer.

17. The touch display panel according to claim 15, wherein the first spacer and the second spacer are at least one of: (1) arranged within a pixel unit; or
(2) arranged at a position where a gate line or a data line is located.

18. The touch display panel according to claim 15, wherein the first substrate is a color filter substrate and the second substrate is an array substrate; and the first signal transmission line transmits a signal which is used to determine a horizontal coordinate of the touch region, and the second signal transmission line transmits a signal which is used to determine a vertical coordinate of the touch region.

19. A touch display panel, comprising a first substrate and a second substrate arranged opposite to each other to form a cell, the second substrate comprising a matrix common electrode, the touch display panel further comprising:

a first signal transmission line arranged on the first substrate and a second signal transmission line arranged on the first substrate, and the second signal transmission line being intersected with the first signal transmission line; and a first spacer corresponding to the first signal transmission line and a second spacer corresponding to the second signal transmission line; wherein the first spacer and the second spacer are configured to enable the first signal transmission line and the second signal transmission line to be electrically connected to the matrix common electrode when a corresponding touch region is in a touch state;

wherein the matrix common electrode comprises a common electrode connecting line; the common electrode connecting line is configured to connect a common electrode and a common electrode line which are at two sides of a gate line on the second substrate so as to form the matrix common electrode; and the first spacer and the second spacer are arranged at two ends of the common electrode connecting line and electrically connected to the common electrode connecting line.

20. The touch display panel according to claim 19, wherein the first substrate is a color filter substrate and the second substrate is an array substrate; and the first signal transmission line transmits a signal which is used to determine a horizontal coordinate of the touch region, and the second signal transmission line transmits a signal which is used to determine a vertical coordinate of the touch region.

\* \* \* \* \*